(12) United States Patent
Nandha Premnath et al.

(10) Patent No.: US 10,979,906 B2
(45) Date of Patent: Apr. 13, 2021

(54) DETECTING MEDIA ACCESS CONTROL (MAC) ADDRESS SPOOFING IN A WI-FI NETWORK USING CHANNEL CORRELATION

(71) Applicant: QUALCOMM Incorporated, San Diego, CA (US)

(72) Inventors: Sriram Nandha Premnath, San Diego, CA (US); Seyed Ali Ahmadzadeh, San Jose, CA (US); Saumitra Mohan Das, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 15/484,356

(22) Filed: Apr. 11, 2017

(65) Prior Publication Data

US 2018/0295519 A1  Oct. 11, 2018

(51) Int. Cl.
*G06F 11/00* (2006.01)
*H04W 12/12* (2021.01)
*H04L 29/06* (2006.01)

(52) U.S. Cl.
CPC ......... *H04W 12/12* (2013.01); *H04L 63/1425* (2013.01); *H04L 63/1466* (2013.01)

(58) Field of Classification Search
CPC .. H04W 12/12; H04W 64/00; H04L 63/1425; H04L 63/1466
See application file for complete search history.

(56) References Cited

U.S. PATENT DOCUMENTS

| | | | |
|---|---|---|---|
| 7,142,108 B2 | 11/2006 | Diener et al. | |
| 7,286,515 B2 | 10/2007 | Olson et al. | |
| 8,196,199 B2 | 6/2012 | Hrastar et al. | |
| 8,694,624 B2 | 4/2014 | Sinha et al. | |
| 9,198,118 B2 | 11/2015 | Larue et al. | |

(Continued)

FOREIGN PATENT DOCUMENTS

| | | | | |
|---|---|---|---|---|
| WO | 2016049833 A1 | 4/2016 | | |
| WO | WO-2016049833 A1 * | 4/2016 | ........... | H04L 63/123 |

OTHER PUBLICATIONS

International Search Report and Written Opinion—PCT/US2018/018890—ISA/EPO—dated Apr. 19, 2018.

(Continued)

*Primary Examiner* — Fatoumata Traore
*Assistant Examiner* — Carlton Johnson
(74) *Attorney, Agent, or Firm* — Michael F. Taveira

(57) ABSTRACT

Various embodiments include systems and methods of determining whether media access control (MAC) address spoofing is present in a network by a wireless communication device. A processor of the wireless communication device may determine an anticipated coherence interval based on a beacon frame received from an access point. The processor may schedule an active scan request and may determine whether a response frame corresponding to the scheduled active request is received within the anticipated coherence interval. The processor may calculate a first correlation coefficient in response to the response frame being received within the anticipated coherence interval and may determine that MAC address spoofing is not present in the network when the first correlation coefficient is greater than a first predetermined threshold.

24 Claims, 10 Drawing Sheets

(56) References Cited

U.S. PATENT DOCUMENTS

| | | |
|---|---|---|
| 2005/0128989 A1 | 6/2005 | Bhagwat et al. |
| 2007/0171885 A1 | 7/2007 | Bhagwat et al. |
| 2008/0043686 A1* | 2/2008 | Sperti .................... G06F 21/55 370/338 |
| 2015/0304822 A1* | 10/2015 | Han ........................ H04W 4/06 370/311 |
| 2016/0330629 A1 | 11/2016 | Laifenfeld et al. |
| 2017/0295180 A1* | 10/2017 | Day .................. G07C 9/00309 |

OTHER PUBLICATIONS

Kim T., et al., "Online Detection of Fake Access Points Using Received Signal Strengths", 2012 IEEE 75th Vehicular Technology Conference (VTC Spring 2012): Yokohama, Japan, May 6-9, 2012, IEEE, Piscataway, NJ, May 6, 2012, pp. 1-5, XP032202729, DOI: 10.1109/VETECS.2012.6240312, ISBN: 978-1-4673-0989-9.

* cited by examiner

DETECTING MEDIA ACCESS CONTROL (MAC) ADDRESS SPOOFING IN A WI-FI NETWORK USING CHANNEL CORRELATION

BACKGROUND

A media access control (MAC) address is an identifier originally assigned by a device manufacturer. After being hard-coded and stored, the MAC address is used for device identification and communication within a communication network.

In some forms of cyber-attacks, an unauthorized device may mask an originally assigned MAC address in order to impersonate another device within the communication network. For example, a "rogue access point" may impersonate a benign or authorized access point in a wireless communication network by spoofing the MAC address of the authorized access point. The rogue access point may use the spoofed MAC address to launch various types of attacks within the network.

Reducing or preventing attacks within a wireless communication network by a rogue access point poses a variety of challenges. For example, devices within the wireless communication network use the MAC address broadcast by an access point to establish or maintain communication between a wireless communication device and the access point. Since network devices cannot differentiate between an authorized access point and a rogue access point based on the MAC address alone, any identification of a rogue access point relies on additional system resources and/or introduces undesirable delays or interruptions of service.

For example, profiles of known benign access points (i.e., an access point whitelist) may be updated and stored at various network nodes including the wireless communication devices, benign access points, and/or servers within the network. When a wireless communication device or a benign access point receives communications from an access point, the MAC address is extracted from the communication and compared to the profiles of the known benign access points. If the MAC address matches a known benign access point, the conventional operations based on the MAC address are allowed to proceed. However, if the MAC address of a known benign access point has been spoofed by a rogue access point after the profiles have been established, the spoofing attack cannot be detected before the wireless communication device attempts to establish communication with the rogue access point or a benign access point initiates de-authentication or-disassociation procedures with the wireless communication device based on communications transmitted using the forged MAC address. Thus, attacks initiated by a device using the forged MAC address may only be thwarted after a first attack is successful and the stored profiles of benign access points is updated to reflect that the previously benign MAC address has been impersonated.

SUMMARY

Various embodiments include methods, and wireless communication devices with a processor implementing the methods of determining whether MAC address spoofing is present in a wireless communication network. Various embodiments may include transmitting an active scan request by the wireless communication device in response to receiving a beacon frame, determining whether a response frame corresponding to the active scan request is received within an anticipated coherence interval following reception of the beacon frame, determining a first correlation coefficient in response to determining that the response frame was received within the anticipated coherence interval; and determining that MAC address spoofing is not present in the network when the first correlation coefficient is greater than a first predetermined threshold.

Some embodiments may further include determining the anticipated coherence interval based on at least one of a speed of the wireless communication device and a frequency band in which the beacon frame is transmitted. Some embodiments may further include measuring a signal characteristic of the beacon frame, and measuring a signal characteristic of the response frame where the determining of the first correlation coefficient comprises determining the first correlation coefficient based on the measured signal characteristic of the response frame and the measured signal characteristic of the beacon frame. In such embodiments, the measured signal characteristic of the response frame or the beacon frame may be based on at least one of a received signal strength indicator (RSSI), a channel impulse response, a channel frequency response, and angle of arrival.

Some embodiments may further include determining a presence of MAC address spoofing in the network in response to determining that the first correlation coefficient is less than the first predetermined threshold, and initiating a counter-measure in response to determining the presence of MAC address spoofing in the network. In such embodiments, the counter-measure may include at least one of a sleep-deprivation attack counter-measure, a de-authentication attack counter-measure, and a disassociation attack counter-measure.

Some embodiments may further include determining whether one or more additional frames are received within the anticipated coherence interval in response to determining that MAC address spoofing is present in the network, determining a frame type of each of the one or more additional frames received within the anticipated coherence interval, determining a second correlation coefficient for each frame type of the one or more additional frames received within the anticipated coherence interval, and initiating a first counter-measure in response to determining that the second correlation coefficient for each frame type is less than a second predetermined threshold. Some embodiments may further include initiating a second counter-measure in response to determining that the second correlation coefficient for each frame type is greater than the second predetermined threshold. In some embodiments, determining a second correlation coefficient for each frame type of the one or more additional frames received within the anticipated coherence interval may include determining the second correlation coefficient based on a measured signal characteristic of the response frame, a measured signal characteristic of the beacon frame, and a measured signal characteristic of one of the one or more additional frames received within the anticipated coherence interval.

Some embodiments may further include receiving a measured signal characteristic corresponding to each frame received at one or more Internet of things (IoT) devices within the anticipated coherence interval, and determining whether MAC address spoofing is present in the network based on the measured signal characteristic corresponding to each frame received at the one or more IoT devices within the anticipated coherence interval.

Various embodiments may further include a wireless communication device having a radio frequency (RF) resource, and a processor coupled to the RF resource and configured with processor executable instructions to perform operations of the methods summarized above. Various embodiments include a wireless communication device having means for performing functions of the methods summarized above. Various embodiments include a non-transitory processor-readable storage medium having stored thereon processor-executable instructions configured to cause a processor of a wireless communication device to perform operations of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1:
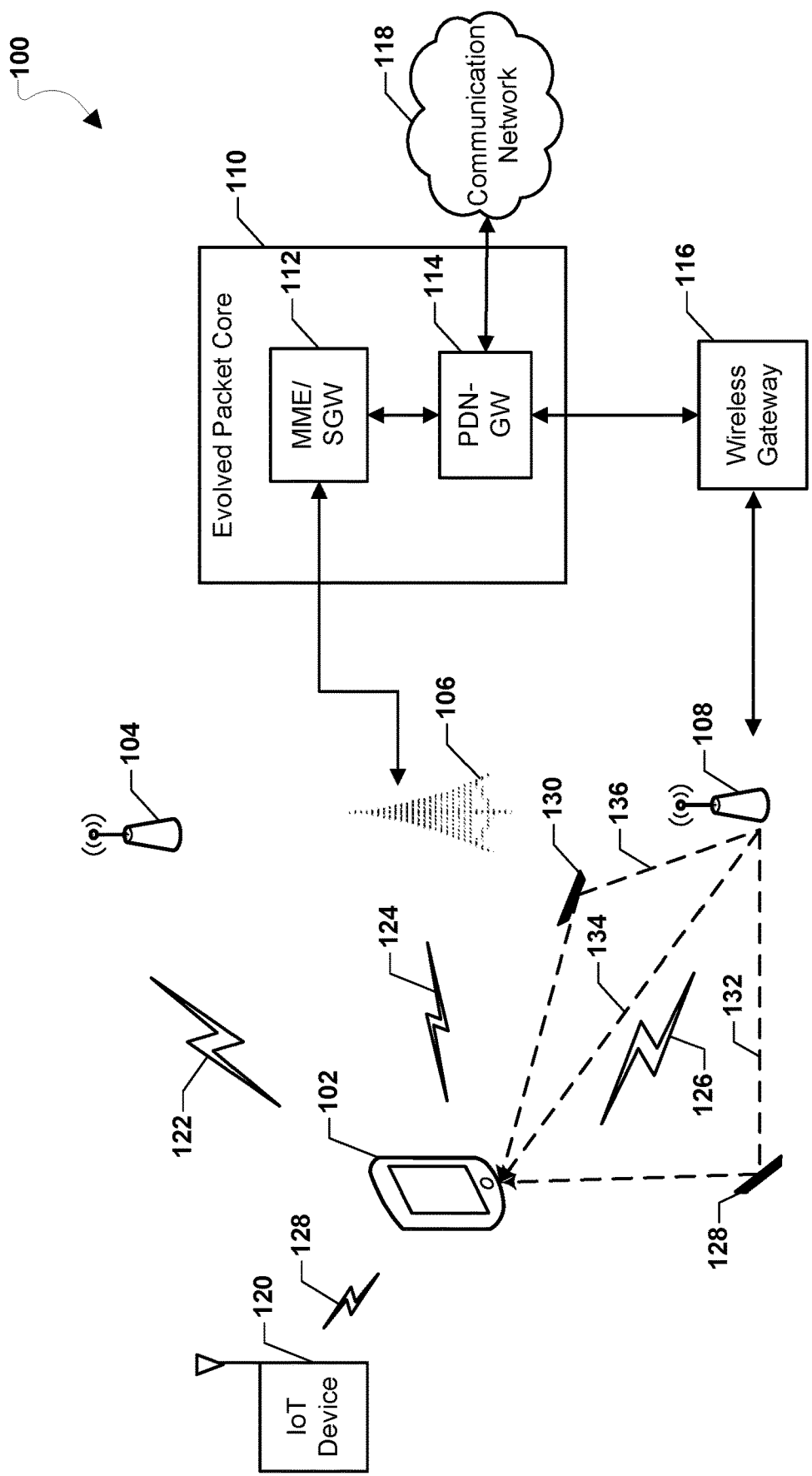
FIG. 1 is a component block diagram of a communication system suitable for use with various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the various embodiments or the claims.

Various embodiments include methods, and computing devices configured to implement the methods, for determining whether MAC address spoofing is present in a wireless communication network. In various embodiments, a processor of a wireless communication device may determine whether MAC address spoofing is present in a communication network based on a calculated or determined correlation coefficient.

The term "wireless communication device" is used herein to refer to any device that may use radio frequency (RF) communications to communicate with another device, for example, as a participant in a wireless communication network.

A wireless communication device implementing various embodiments may include any one or all of mobile computing devices, laptop computers, tablet computers, cellular telephones, smartphones, personal or mobile multi-media players, personal data assistants (PDAs), smartbooks, palmtop computers, wireless electronic mail receivers, multimedia Internet enabled cellular telephones, wireless gaming systems and controllers, smart appliances including televisions, set top boxes, kitchen appliances, lights and lighting systems, smart electricity meters, air conditioning/HVAC systems, thermostats, building security systems including door and window locks, vehicular entertainment systems, vehicular diagnostic and monitoring systems, unmanned and/or semi-autonomous aerial vehicles, automobiles, sensors, machine-to-machine devices, and similar devices that include a programmable processor, memory, and/or circuitry for establishing wireless communication pathways and transmitting/receiving data via wireless communication networks. Various embodiments may be particularly useful in mobile computing and mobile communication devices, such as smart phones, tablet computers and other portable computing platforms that are easily transported to locations where rogue access points may lurk.

The term "rogue access point" is used herein to refer to any access point that transmits communications using a forged or spoofed MAC address.

The terms "component," "module," "system," and the like as used herein are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A rogue access point may launch various types of attacks on wireless communication devices in a wireless communication network by using a spoofed MAC address. For example, a rogue access point may launch a sleep-deprivation attack, a de-authentication attack, a disassociation attack, or any other denial-of-service attack by spoofing the MAC address of a legitimate access point providing a wireless communication network.

The different types of attacks by rogue access points can undesirably affect the performance of a wireless communication device associated with a wireless communication network or the coverage and/or capacity of the wireless communication network. For example, during a sleep-deprivation attack, a rogue access point may transmit beacon frames using a forged MAC address of an authorized access point providing a wireless communication network. By continually receiving beacon frames, the wireless communication device may be prevented from entering a sleep or idle state, which may quickly drain the battery of the wireless communication device.

De-authentication and disassociation attacks by rogue access points disrupt communication between a wireless communication device and an authorized access point providing a wireless communication network. For example, a rogue access point may broadcast a de-authentication frame or a disassociation frame using a forged MAC address. A wireless communication device receiving such frame may disassociate from the authorized access point, which may undesirably interrupt the communication between the wireless communication device and the wireless communication network. In order to reestablish communications with the wireless communication network, the wireless communication device must first initiate subsequent authentication and/or association procedures, which may introduce undesirable delay and/or interruption of service.

The detection of a MAC address spoofing attack by a rogue access point poses challenges in conventional communication systems. This is particularly the case for a mobile wireless communication device that may encounter signals from a rogue access point in a new location with no prior knowledge of characteristics or profile information of the legitimate access point(s) hosting a local wireless communication network.

Various embodiments include methods that may be implemented on a wireless communication device for determining whether MAC address spoofing is present where a wireless communication network is being supported by a legitimate access point. In various embodiments, a processor of a wireless communication device may determine whether MAC address spoofing is present based on one or more wireless signal characteristics sampled during active and passive scans of a wireless communication network performed by the wireless communication device. The one or more sampled signal characteristics may be used to calculate a coefficient to determine a correlation between a sampled signal characteristic associated with beacon frames and sampled signal characteristic associated with response frames received from a legitimate access point and a rogue access point if present. Thus, various embodiments enable a wireless communication device to dynamically determine or recognize whether MAC address spoofing is present in an area including a wireless communication network based on sampled wireless signal characteristics alone without relying on previously stored profile information of known benign or legitimate access points.

When a wireless signal (e.g., a radio wave) is transmitted from an antenna of a transmitting wireless access point, the wireless signal may propagate along multiple paths before reaching a receiving device. This multipath propagation can be caused by reflection, refraction, diffraction, atmospheric ducting, ionospheric reflection, etc. Multipath propagation may result in variations of the signals received at the receiving device depending on the number and characteristics of the different signal propagation paths.

For example, a wireless signal transmitted by a first access point may propagate along a first path, a second path, and a third path before reaching a wireless communication device. As the wireless signal propagates over the first path, the wireless signal may reflect off of a first intermediate object introducing a unique variation to the transmitted wireless signal. Likewise, as the wireless signal propagates over the second path, the wireless signal may reflect off of a second intermediate object introducing another unique variation to the transmitted wireless signal.

Multipath signal propagation characteristics may vary over time and/or space due to the location and/or mobility of a transmitting device, the location and/or mobility of a receiving device, mobility of intermediate objects, environmental factors, etc. The variations introduced to the wireless signal during propagation create unique signal characteristics that may be measured by the receiving device.

However, two different wireless signals propagating between the same transmitting and receiving device pair within a predictable time interval, referred to herein as a coherence interval, may encounter the same or substantially similar factors that introduce unique variations to the wireless signals. For example, because each wireless signal within the coherence interval will likely encounter the same or substantially similar factors that influence signal propagation, the resulting variations to each wireless signal may be similar. Thus, a signal characteristic measured on a channel associated with the first wireless signal by the receiving device may be the same or substantially similar to a signal characteristic measured on the channel associated with the second wireless signal by the receiving device. When signal characteristics corresponding to the two different wireless signals are the same or substantially similar, the two signal characteristics may be considered to have a high correlation with respect to each other.

Conversely, when a receiving device receives wireless signals from two different devices transmitting from different locations, the signal characteristics of each wireless signal will typically be measurably different due to the different propagation paths and influences encountered by the different wireless signals. Thus, a signal characteristic measured on a channel associated with a first wireless signal received from a first transmitting device (e.g., a legitimate access point) will be quite different from, and thus uncorrelated (i.e., exhibit low correlation) with a signal characteristic measured on a channel associated with a second wireless signal received from a second transmitting device (e.g., a rogue access point). Signal characteristic measurements from two transmitters may be determined to be uncorrelated by a receiver device if the distance between the two transmitters is greater than a decorrelation distance, which depends on the wavelength of the signal.

In various embodiments, the wireless communication device may infer the existence of a rogue access point performing MAC address spoofing in a wireless communication network based on a diminished correlation of wireless channel samples between active and passive scans conducted by the wireless communication device. For example, the wireless communication device may detect the presence of multiple access points transmitting information using the same MAC address (e.g., the presence of a rogue access point) by detecting inconsistent channel correlation caused by the different propagation paths between active scan response frames transmitted by the multiple access points and a beacon frame transmitted by one of the access points. In various embodiments, this inconsistent channel correlation may be determined by a wireless communication device based on one or more measured signal characteristics (such as RSSI) of the response frames and the beacon frames.

In some embodiments, if the wireless communication device detects MAC address spoofing in a wireless communication network, the wireless communication device may further identify or classify the type of attack. The classification of different types of attacks (e.g., sleep deprivation attack, de-authentication attack, disassociation attack, etc.) by the wireless communication device may be based on a degree of correlation in channel measurements across one or more of beacon frames, active scan response frames, de-authentication frames, disassociation frames, etc. In some embodiments, the wireless communication device may initiate a counter-measure to the attack based on the type of attack detected by the wireless communication device.

In some embodiments, the methods for determining whether MAC address spoofing is present in a network may be implemented in a wireless communication network including Internet of things (IoT) devices and/or smart home devices. For example, signal channel measurements detected at the IoT devices and/or smart home devices may be used to overcome a potential jamming adversary, to obtain a better vantage point to detect a rogue access point, etc.

Various embodiments may be implemented within a variety of communication systems 100, an example of which is illustrated in FIG. 1. The communication system 100 may include a wireless communication device 102, a first access point 104, which in the illustrated example is an unauthorized or rogue access point, a second access point 108, a third access point 106, an evolved packet core 110, an Internet of things (IoT) device 120, and a communication network 118.

The first access point 104, the second access point 106, and the third access point 108 may be configured to communicate with the wireless communication device 102. In various embodiments, the first access point 104, the second access point 106, and the third access point 108 may be a Wi-Fi access point, a macrocell access point, a microcell access point, a picocell access point, a femtocell access point or the like. While three access points are illustrated in FIG. 1, any number of access points may be implemented within the communication system 100. For example, the communication system 100 may not include the first (i.e., rogue) access point 104 when MAC address spoofing is not present in the communication system 100. In addition, while it is likely that at least one of the first access point 104, the second access point 106, and the third access point 108 is a Wi-Fi access point, the communication system 100 does not require a Wi-Fi access point to implement any of the various embodiments.

For purposes of example, the first access point 104 is a rogue access point configured to impersonate a benign or authorized access point. For example, the first access point 104 may be a rogue access point that forges or spoofs the MAC address of a benign access point 106 or 108. The first access point 104 may be a stand-alone device or the first access point 104 may be integrated into another device. In some situations, the first access point 104 may also have gained unauthorized access to communicate with the communication network 118 or separately with the Internet so as to support wide area network communications to appear legitimate while otherwise conducting a cyber-attack.

The second access point 106 may be configured to communicate with the evolved packet core 110 over a wired or wireless communication link, which may include twisted-pair backhaul links, fiber optic backhaul links, microwave backhaul links, cellular data networks, and other suitable communication links.

The third access point 108 may be a benign access point authorized by the communication system 100 such that the third access point 108 is in communication with the communication network 118. In some embodiments, the third access point 108 may be a wireless local area network (WLAN) access point, such as a Wi-Fi "hotspot."

The evolved packet core 110 may be configured to facilitate communication of control and user information between the communication network 118 and the wireless communication device 102. While the evolved packet core 110 illustrated in FIG. 1 is described based on 3GPP architecture, the evolved packet core 110 may use any communication protocol and may include various devices configured to facilitate communication of control and user information between the communication network 118 and the wireless communication device 102.

In various embodiments, the evolved packet core 110 may include a mobility management entity/serving gateway (MME/SGW) device 112 and a packet data network (PDN) gateway (PDN-GW) 114. FIG. 1 illustrates the MME/SGW device 112 as a combination MME and SGW device. However, the MME and the SGW may be implemented as separate devices within the evolved packet core 110. The MME may be a control node that processes the signaling between the wireless communication device 102 and the evolved packet core 110. Generally, the MME may provide bearer and connection management. The MME may be responsible for idle mode tracking and paging of the wireless communication device 102, bearer activation and deactivation, and SGW selection for the wireless communication device. The MME may additionally authenticate the wireless communication device 102 and implement Non-Access Stratum (NAS) signaling with the wireless communication device 102. All Internet Protocol (IP) packets addressed to the wireless communication device 102 may be transferred through the SGW, which may be connected to the PDN-GW 114. The SGW may reside in the user plane and act as a mobility anchor for inter-access node handovers and handovers between different technologies. The PDN-GW 114 may provide connectivity to the communication network 118. The PDN-GW 114 may provide IP address allocation to the wireless communication device 102 as well as other functions.

In various embodiments, the second access point 106 and the third access point 108 may provide the wireless communication device 102 with access to the communication network 118 via the evolved packet core 110 using different radio access technologies (RATs). For example, the second access point 106 may provide the wireless communication device 102 access to the communication network 118 using Long Term Evolution (LTE) access technology and the third access point 108 may provide the wireless communication device 102 access to the communication network 118 using WLAN access technology defined by the Institute of Electrical and Electronic Engineers (IEEE) 802.11 standard.

In some embodiments, the second access point 106 may access the evolved packet core 110 directly by communicating with the MME/SGW device 112. The third access point 108 may access the evolved packet core 110 through the wireless gateway 116.

The wireless communication device 102 may detect and attempt to associate with the first access point 104 over a first communication link 122, the second access point 106 over a second communication link 124, and the third access point 108 over a third communication link 126. While the first communication link 122, the second communication link 124, and the third communication link 126 are each illustrated as a single link, each of the first communication link 122, the second communication link 124, and the third communication link 126 may include a plurality of carrier signals, frequencies, or frequency bands, each of which may include a plurality of logical channels. Further, each of the communication links 122, 124 and 126 may correspond to a set of multipath components. For example, the illustrated communication link 126 includes three multipath components 132, 134 and 136. Multipath component 134 represents a line of sight path between the wireless communication device 102 and the access point 108; multipath components 132 and 136 are formed through the reflection of signals at reflecting surfaces 128 and 130, respectively, in the environment. The first communication link 122 and the third communication link 126 may use a relatively short-range wireless communication protocol such as Wi-Fi, Zig-Bee, Bluetooth, IEEE 802.11, and others. The second communication link 124 may include cellular communication links using 3GPP Long Term Evolution (LTE), Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies. Additionally, the first communication link 122, the second communication link 124, and/or the third communication link 126 may utilize more than one radio access technology (RAT).

In some embodiments, an IoT or smart home device 120 may be a wireless communication device configured to communicate with one or more devices within the system 100 using RF communications including wireless communication device 102. Additional communications may include communications with another wireless device, a base station (including a cellular communication network base station and an IoT base station), an access point (including an IoT access point), or other wireless devices. However, the IoT device 120 is not required by the communication system 100 to perform the various embodiments.

In various embodiments, the wireless communication device 102 may determine whether MAC address spoofing is present in the communication system 100 based on a correlation coefficient between beacon and response signals that is calculated by the wireless communication device 102. For example, if the first access point 104 is forging the MAC address of the second access point 106 or the third access point 108, the wireless communication device 102 may recognize the presence of MAC address spoofing because the correlation coefficient calculated by the wireless communication device 102 between beacon and response signals will be less than a pre-determined correlation threshold.

Figure 2:
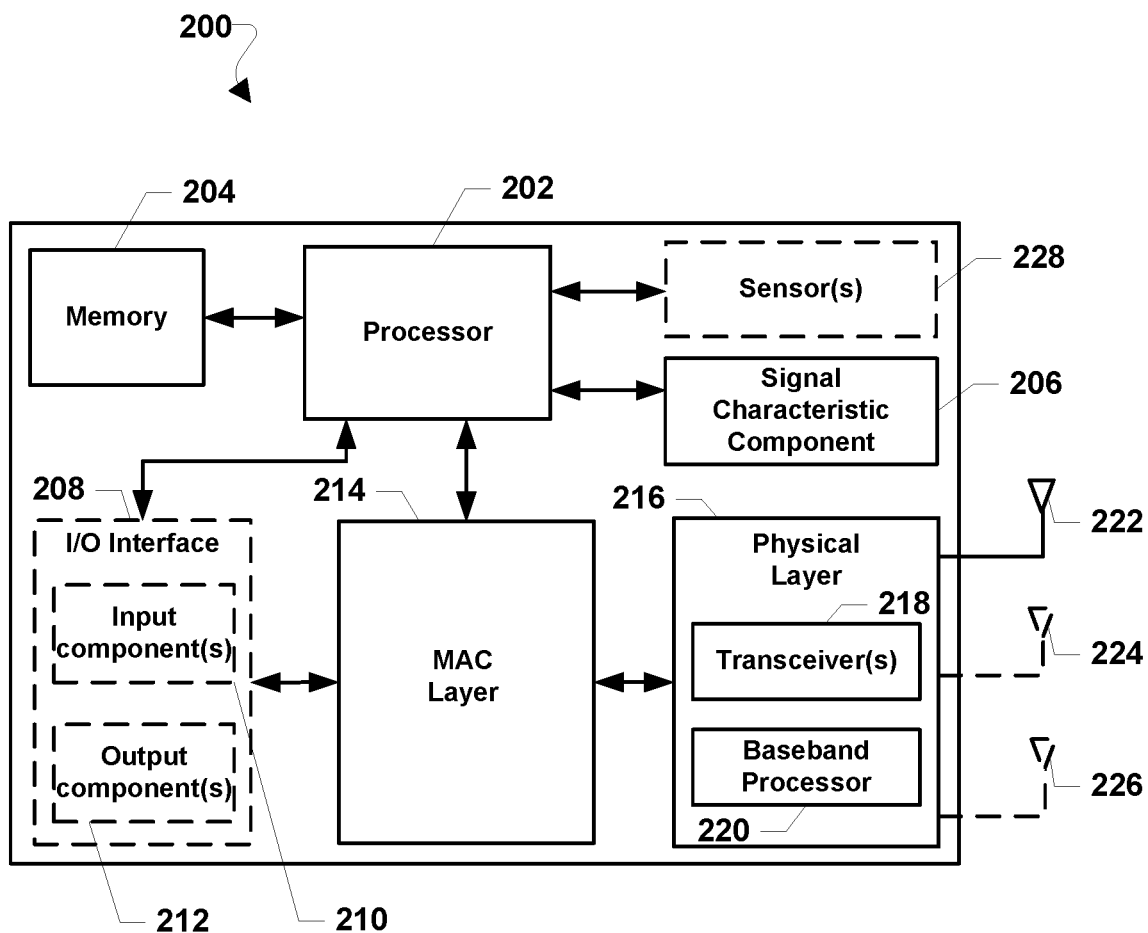
FIG. 2 is a component block diagram of a wireless communication device according to various embodiments.

FIG. 2 illustrates a component block diagram of an example of a wireless communication device 200 suitable for use with various embodiments. With reference to FIGS. 1 and 2, the wireless communication device 200 may be similar to the wireless communication device 102 and/or the IoT device 120.

The wireless communication device 200 may include at least one controller, such as a processor 202. The processor 202 may be a processor configurable with processor-executable instructions to execute operations of the various embodiments, a specialized processor, such as a modem processor, configurable with processor-executable instructions to execute operations of the various embodiments in addition to a primary function, a dedicated hardware (i.e., "firmware") circuit configured to perform operations of the various embodiments, or a combination of dedicated hardware/firmware and a programmable processor.

The processor 202 may be coupled to a memory 204, which may be a non-transitory computer-readable storage medium that stores processor-executable instructions. The memory 204 may store an operating system, as well as user application software and executable instructions. The memory 204 also may store application data, such as an array data structure. The memory 204 may include one or more caches, read only memory (ROM), random access memory (RAM), electrically erasable programmable ROM (EEPROM), static RAM (SRAM), dynamic RAM (DRAM), or other types of memory. The processor 202 may read and write information to and from the memory 204. The memory 204 also may store instructions associated with one or more protocol stacks. A protocol stack generally includes processor-executable instructions to enable communication using a radio access protocol or communication protocol.

The wireless communication device 200 may further include a communication interface 216 for connecting the wireless communication device 200 to a communication network (such as the communication network 118). The communication interface 216 may include physical layer components that may perform various encoding, signaling, and/or data transmission and reception functions. For example, the communication interface 216 may include one or more transceivers 218 and a baseband processor 220 for carrying out the various functions of the communication interface 216. The communication interface 216 may include one or more wireless antennas (such as wireless antennas 222, 224, and 226) to support wireless communications between the wireless communication device 200 and other devices. Each of the transceivers 218 may be configured to provide communications using one or more frequency bands associated with one or more RATs. The number of wireless antennas in the wireless communication device 200 is not limited to three as illustrated in FIG. 2, but may include any number of antennas. In addition, while not illustrated in FIG. 2, the communication interface 216 may further include one or more ports configured to provide a wired interface connection to a network such as an Ethernet connection, a fiber optic connection, a broadband cable connection, a telephone line connection, or other types of wired communication connections.

The processor 202 may be coupled to a machine access control layer 214. The machine access control layer 214 may provide addressing and channel access control mechanisms between the I/O interface 208, the communication interface 216, and/or the processor 202 to allow the wireless communication device 200 to communicate with other devices such as the first access point 104, the second access point 106, the third access point 108, the IoT device 120 and/or other wireless communication devices.

The wireless communication device 200 may further include a signal characteristic component 206 configured to sample or determine one or more signal characteristics corresponding to communications received from other devices at the communication interface 216. In various embodiments, the signal characteristic component 206 may further process, measure, or derive channel behavior from the sampled signal characteristics. The signal characteristic component 206 may sample or determine one or more different types of signal characteristics associated with a signal frequency, signal strength, round-trip time (RTT), amplitude of multipath components, etc. While not an exhaustive list, some of the sampled or determined signal characteristics may include one or more of a received signal strength indicator (RSSI) value, a received channel power indicator (RCPI) value, a channel impulse response, a channel frequency response, an angle of arrival, etc. These signal characteristics may be used to determine the correlation coefficient metric in various embodiments.

In various embodiments, the signal characteristic component 206 may be embodied in software, firmware, hardware, or some combination of software, firmware, and hardware. The signal characteristic component 206 is illustrated as a separate component coupled to the processor 202; however, at least a portion of the signal characteristic component 206 may be incorporated into the communication interface 216 and/or the processor 202.

In some embodiments, the wireless communication device 200 may further include one or more sensors 228 and/or an input/output (I/O) interface 208. The one or more sensors 228 may be configured to measure various characteristics associated with the wireless communication device 200. For example, the one or more sensors 228 may include one or more of a camera, a proximity sensor, an ambient light sensor, an accelerometer, a near field communication sensor, a gyroscope, a magnetometer, a temperature sensor, a barometric pressure, a color sensor, an ultraviolet sensor, a global positioning system (GPS) sensor, etc. The I/O interface 208 may be configured to allow, enable or provide one or more kinds of input and/or outputs at the wireless communication device 200. For example, the I/O interface 208 may include or be coupled to input components 210, such as one or more of a speaker, a light, a switch, etc., and output components 212, such as one or more of a display, a touchscreen, a keypad, a keyboard, a button, a microphone, etc.

While not illustrated in FIG. 2, the wireless communication device 200 also may include a bus for connecting the various components of the wireless communication device 200 together, as well as hardware or software interfaces to enable communication among the various components. The wireless communication device 200 also may include various other components not illustrated in FIG. 2. For example, the wireless communication device 200 may further include various connection ports, additional processors or integrated circuits, and many other components.

Figure 3:
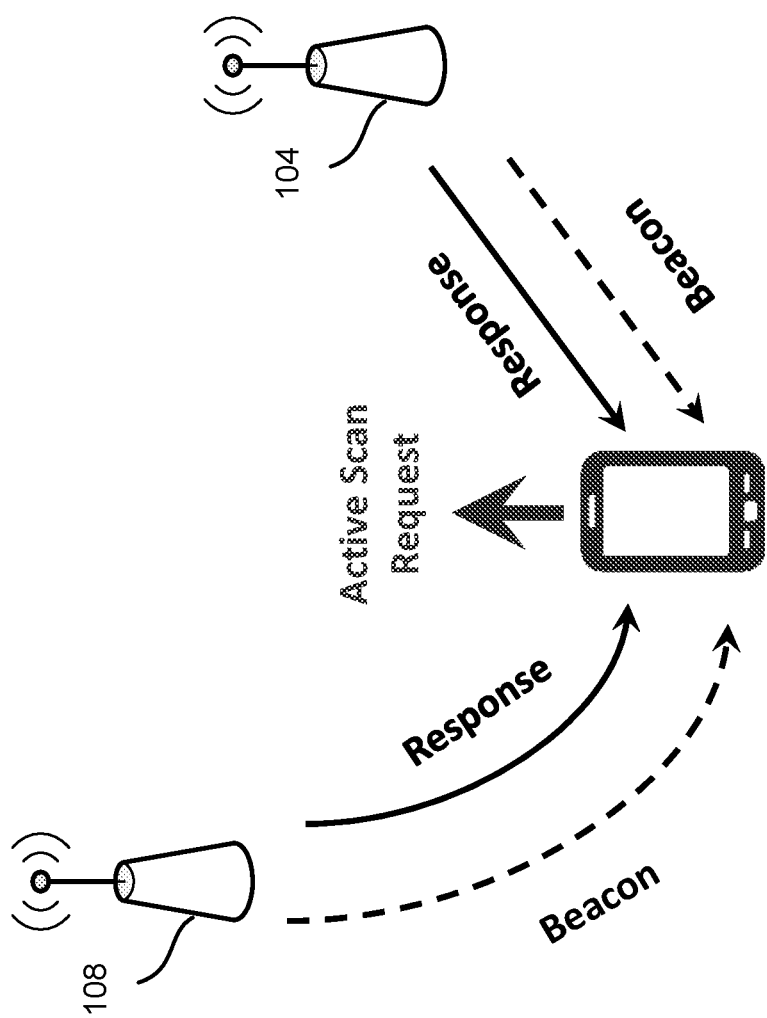
FIG. 3 is a signal flow diagram illustrating communication flows in a system according to various embodiments.

FIG. 3 illustrates an exemplary of signal flows in a communication system according to various embodiments. With reference to FIGS. 1-3, wireless communication device 102 may perform active and passing scanning for suitable access points. During a passive scan of the network, the wireless communication device 102 receives beacon frames that are broadcasted from the wireless access points 104, 108, etc. During an active scan of the network, the wireless communication device 102 may transmit the scheduled active scan request (e.g., "Active Scan Request") according to an anticipated coherence interval. If a rogue access point (e.g., 104) is spoofing the MAC address of a legitimate access point (e.g., 108+, both the rogue access point 104 and the legitimate access point 108 will receive and process the active scan request transmitted from the wireless communication device 102. In response to receiving the active scan request, both the rogue access point 104 and the legitimate access point 108 will transmit a response frame (e.g., "Response"). In various embodiments, the wireless communication device 102 samples or measures one or more signal characteristics associated with each received response frame, and the beacon frame.

Figure 4:
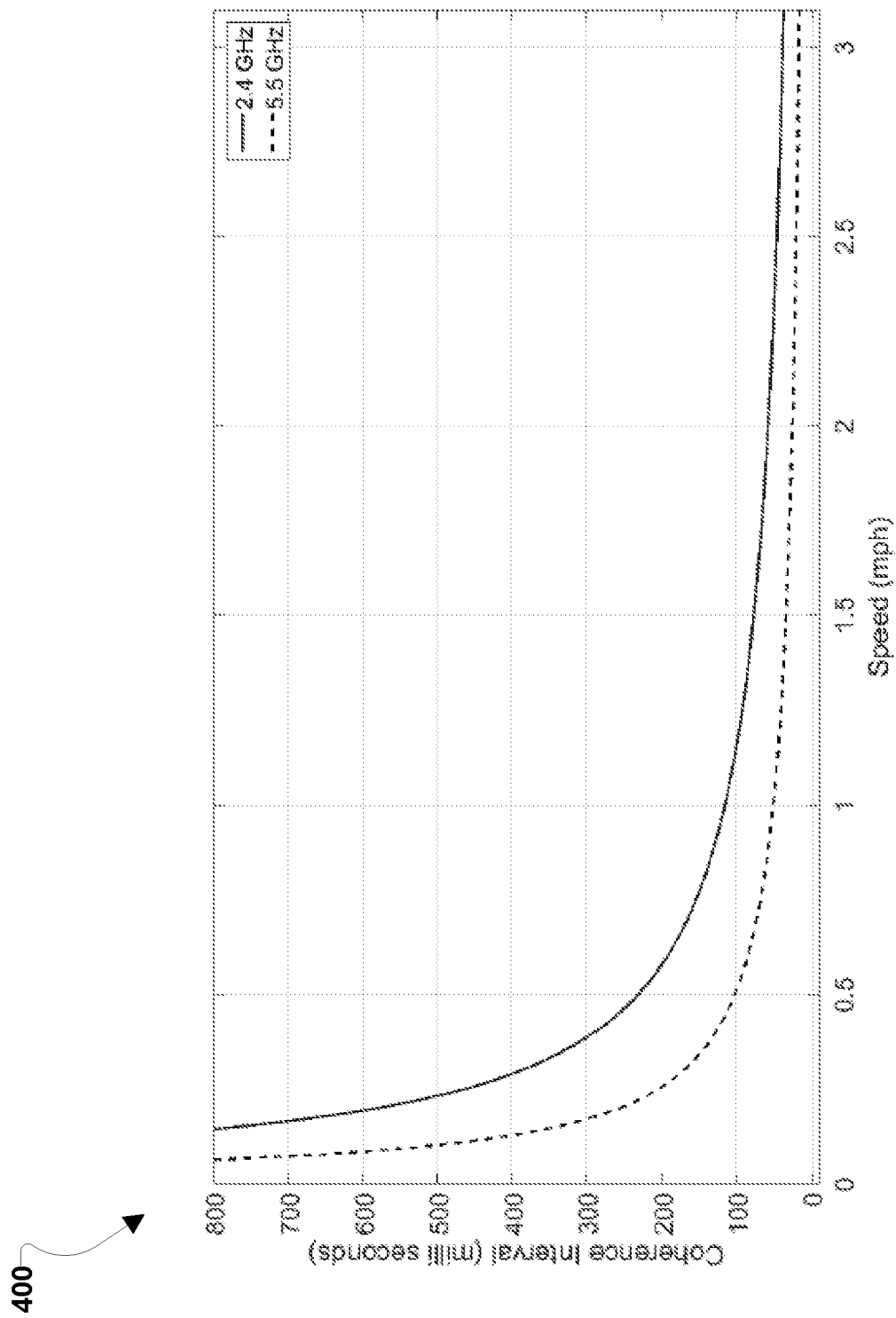
FIG. 4 is a graph illustrating exemplary coherence intervals according to various embodiments.

FIG. 4 is a graph 400 illustrating exemplary coherence intervals according to various embodiments. With reference to FIGS. 1-4, the graph 400 illustrates correlation between a coherence interval and the speed of the wireless communication device 102 over two different frequency bands (e.g., 2.4 GHz and 5.5 GHz).

Figure 5A:
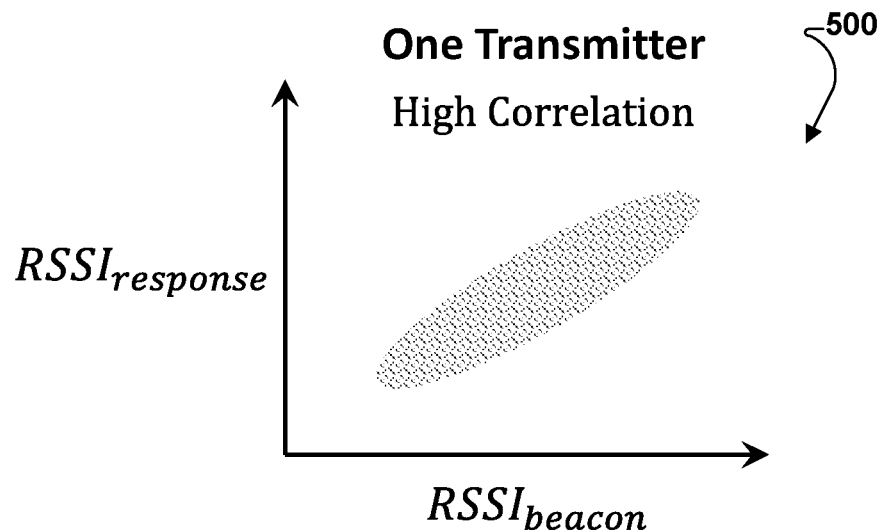
FIGS. 5A and 5B are scatter plot graphs of signal characteristic correlations according to various embodiments.
Figure 5B:
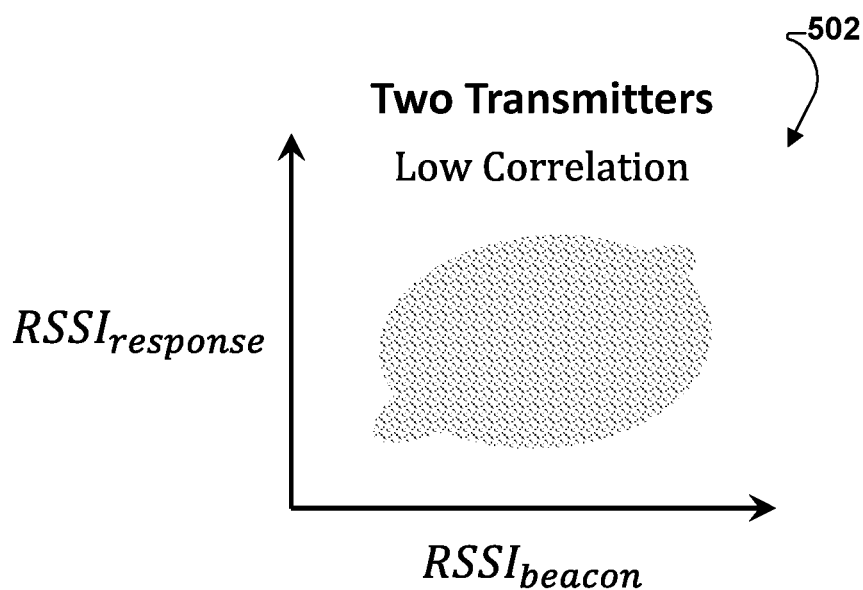

FIGS. 5A and 5B are exemplary scatter plot graphs of signal characteristic correlations according to various embodiments. With reference to FIGS. 1-5B, the scatter plots visually illustrate the difference in channel correlation based on a sampled signal characteristic. For example, the graph 500 in FIG. 5A is a scatter plot illustrating a high channel correlation between a sampled RSSI value associated with a response frame (e.g., "$RSSI_{response}$") and a sampled RSSI value associated with a beacon frame (e.g., "$RSSI_{beacon}$") because only one access point (e.g., 108) transmitted both the response frames and the beacon frames. In contrast, the graph 502 in FIG. 5B is a scatter plot illustrating a low channel correlation between a sampled RSSI value associated with a beacon frame (e.g., "$RSSI_{beacon}$") and a sample RSSI value associated with a response frame (e.g., "$RSSI_{response}$") when the wireless communication device 102 receives a mixture of the beacon frames and/or response frames from both the rogue access point (e.g., 104) and the legitimate access point (e.g., 108). In some embodiments, when the correlation between the sampled signal characteristic is less than a low threshold, the processor may determine that MAC address spoofing is present in the network. Alternatively or additionally, in some embodiments, when the correlation between the sampled signal characteristic is greater than a high threshold, the processor may determine that MAC address spoofing is not present in the network.

Figure 6:
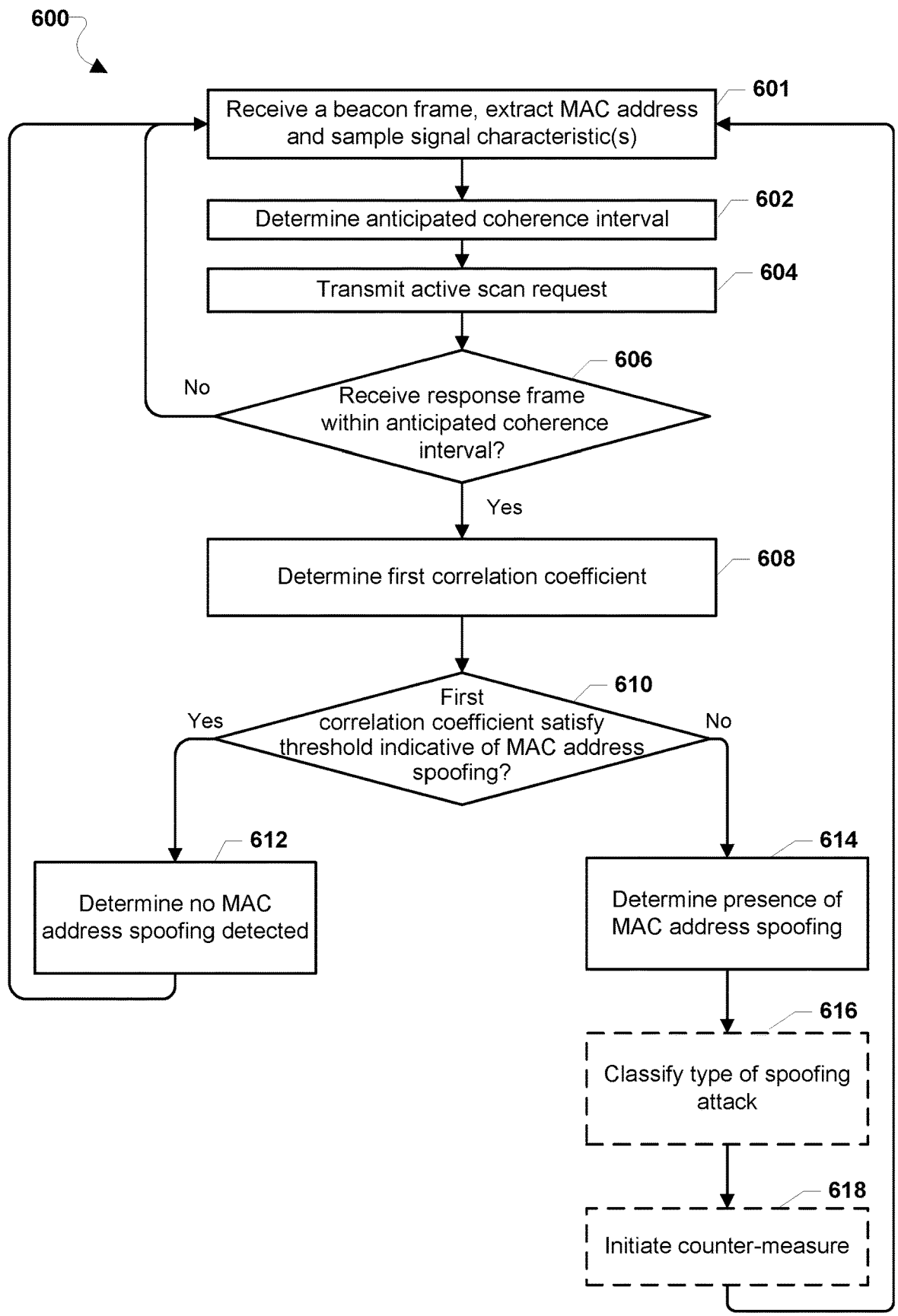
FIG. 6 is a process flow diagram illustrating a method of determining whether MAC address spoofing is present in a network according to various embodiments.

FIG. 6 is a process flow diagram illustrating a method 600 of determining whether MAC address spoofing is present in a network according to various embodiments. With reference to FIGS. 1-6, the method 600 may be implemented by one or more processors (e.g., 202) of a wireless communication device (e.g., 102, 200).

In block 601, a wireless communication device 102 receives a beacon frame from an access point. For clarity and ease of explanation, it is assumed that the received beacon frame is transmitted by a benign access point such as access point 108. However, the beacon frame may be transmitted by either a benign access point (e.g., 108) or a rogue access point (e.g., 102). A processor of the wireless communication device extracts a MAC address included in the first beacon frame. In addition, the processor may sample one or more signal characteristics on a channel associated with the first beacon frame.

In block 602, the processor may determine an anticipated coherence interval. The anticipated coherence interval may be determined by the processor in various ways including a look-up table, one or more algorithms or equations, a model, etc. In addition, the anticipated coherence interval may be determined based on at least one of a speed of the wireless communication device, and a frequency band in which the first beacon frame is transmitted.

In some embodiments, the processor may calculate an anticipated coherence interval (e.g., coherence time) in block 602 using a speed of the wireless communication device 102, and a measured signal wavelength ($\lambda$) associated with the first beacon frame. Alternatively, the anticipated coherence interval may be determined using a model, such as the model illustrated in FIG. 4, that correlates a coherence interval with the speed of the wireless communication device 102 over two different frequency bands (e.g., 2.4 GHz and 5.5 GHz). In typical stationary settings (i.e., when the wireless communication device 102 remains substantially stationary and is not moving with respect to the access point 108), the coherence interval may be determined to be significantly greater than 100 ms. For example, using the model illustrated in FIG. 4, when the speed of the wireless communication device 102 communicating using the 5.5 GHz frequency band is near 0, the processor may determine that the anticipated coherence interval is greater than 800 ms. When the speed of the wireless communication device 102 communicating using the 2.4 GHz frequency band is 2.5 mph, for example, the processor may determine that the anticipated coherence interval is approximately 50 ms. In some embodiments, it may be feasible for the wireless communication device 102 to schedule active scan requests as well as receive response frames within a coherence interval associated with periodically transmitted beacon frames.

In block 604, the processor may initiate transmission of an active scan request. For example, the processor may schedule an active scan request to occur during the anticipated coherence interval determined in block 602, where the active scan request is generated by the processor and transmitted from the wireless communication device 200 via a transceiver (e.g., 218). The active scan request may be generated to include the MAC address extracted from the first beacon frame.

It is noted that since processing of a received active scan request is based on the MAC address included in the active scan request transmitted by the wireless communication device 102, if a rogue access point 104 is not present or if the rogue access point 104 is spoofing the MAC address of an access point different from the third access point 108, only the third access point 108 will process the active scan request transmitted from the wireless communication device 102.

During a passive scan of wireless networks, the wireless communication device 102 continues to monitor for beacon frames as illustrated in FIG. 3. Thus, in response to receiving a second beacon frame (e.g., "Beacon") from the first access node 104 and/or the third access node 108, the wireless communication device 102 samples or measures one or more signal characteristics associated with each second beacon frame.

In determination block 606, the processor may determine whether a response frame was received within the anticipated coherence interval. For example, the processor may determine whether at least one of the response frame received from the first access point 104 and the response frame received from the second access point 108 was received during the anticipated coherence interval.

In response to determining that a response frame was not received within the anticipated coherence interval (i.e., determination block 606="No"), the processor may return to block 601 to receive a subsequent beacon frame, and determine the new anticipated coherence interval.

In response to determining that a response frame was received within the anticipated coherence interval (i.e., determination block 606="Yes"), the processor may calculate a first correlation coefficient in block 608. In various embodiments, given a set of signal characteristics (e.g., channel measurements) associated with a beacon frame and a response frame, the processor can determine whether a MAC address spoofing attack has occurred based on the correlation coefficient determined in block 608. For example, a first correlation coefficient may be calculated based on signal characteristics associated with a beacon frame (e.g., the first beacon frame or the second beacon frame) and the response frame. For example, the first correlation coefficient ("Corr Coeff (X,Y)") may be calculated using the following equation:

$$\text{Corr } Coeff(X, Y) = \frac{E[(X - \mu_X)(Y - \mu_Y)]}{\sqrt{E[(X - \mu_X)^2]} \times \sqrt{E[(Y - \mu_Y)^2]}}$$

where X represents a sample of the signal characteristic associated with the beacon frame, Y represents a sample of the signal characteristic associated with the response frame, $\mu_X$ represents a mean value of the sample of the signal characteristic associated with the beacon frame, and $\mu_Y$ represents a mean value of the sample of the signal characteristic associated with the response frame.

In various embodiments, the signal characteristic evaluated by the processor in determining a correlation coefficient may include one or more of a RSSI value, a RCPI value, a channel impulse response, a channel frequency response, an angle of arrival, etc.

In determination block 610, the processor may determine whether the calculated first correlation coefficient equal, exceeds or is less than a threshold. In some embodiments, the threshold may be a correlation coefficient value that is indicative of either the presence of MAC address spoofing (i.e., a low correlation coefficient threshold). In some embodiments, the threshold may be a correlation coefficient value that is indicative of the absence of MAC address spoofing (i.e., a high correlation coefficient threshold). For example, the processor may determine whether the calculated first correlation coefficient is greater than or less than a first predetermined threshold or parameter $\theta_1$.

In some embodiments, the first predetermined threshold or parameter $\theta_1$ may be determined using machine learning. For example, the first parameter $\theta_1$ may be learned from a training dataset corresponding to one or more known communication systems. The first parameter $\theta_1$ may be determined before initiating the methods of various embodiments. In addition, the first parameter $\theta_1$ may be updated either at discrete times or at predetermined intervals.

In response to determining that the calculated first correlation coefficient is greater than or equal to a threshold indicative of no MAC address spoofing (i.e., determination block 610="Yes"), the processor may determine that no MAC address spoofing is detected in block 612, and returns to block 601 to receive a subsequent beacon frame and determine the new anticipated coherence interval.

In response to determining that the calculated first correlation coefficient is less than a threshold indicative of MAC address spoofing (i.e., determination block 610="No"), the processor may determine that MAC address spoofing is detected in block 614.

In some embodiments, in response to determining the presence of MAC address spoofing in block 614, the processor may perform additional operations. For example, in some embodiments, the processor may classify a type of spoofing attack in block 616 and/or initiate a counter-measure in block 618. Alternatively or additionally, the processor may stop active scans using the MAC address extracted from the first beacon frame indefinitely or for a predetermined amount of time.

Figure 7:
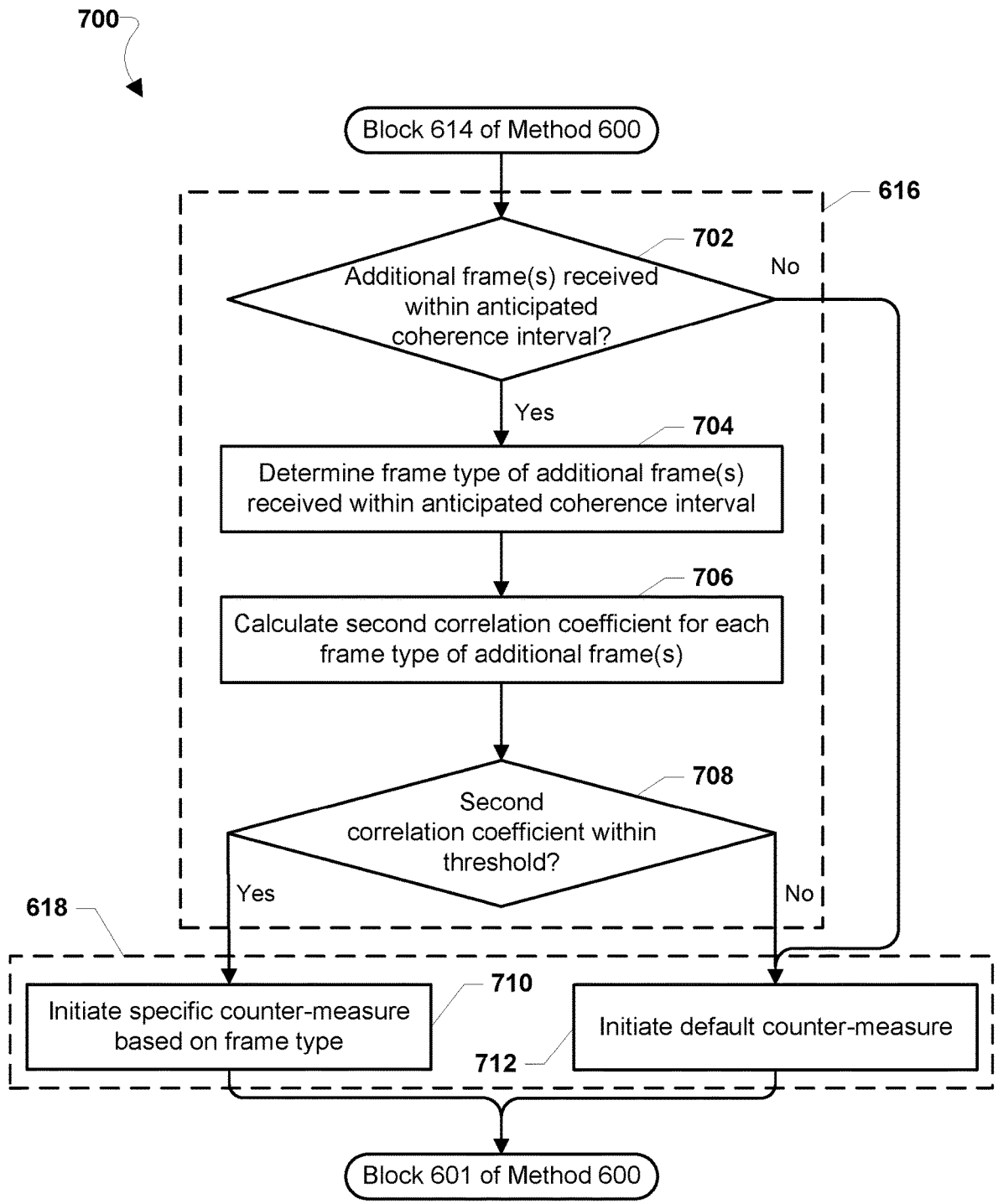
FIG. 7 is a process flow diagram illustrating another method of determining whether MAC address spoofing is present in a network according to various embodiments.

FIG. 7 illustrates a method 700 for classifying a MAC address spoofing attack according to some embodiments. With reference to FIGS. 1-7, the method 700 includes examples operations that may be performed by a processor in blocks 616 and 618 of the method 600. The method 700 may be implemented by one or more processors (e.g., 202) of a wireless communication device (e.g., 102, 200).

In determination block 702, the processor may determine whether one or more additional frames were received within the anticipated coherence interval. For example, after the processor of the wireless communication device determines that MAC address spoofing is present, the processor may determine whether one or more additional frames were received from the rogue access point (e.g., 104) and/or the legitimate access point (e.g., 108).

In response to determining that no additional frames were received within the anticipated coherence interval (i.e., determination block 702="No"), the processor may initiate a default counter-measure in block 712.

In response to determining that one or more additional frames were received within the anticipated coherence interval (i.e., determination block 702="Yes"), the processor may determine a frame type for each of the additional frames received within the anticipated coherence interval in block 704. For example, the processor may identify the frame type for each additional frame as one of a beacon frame, an active scan response frame, a de-authentication frame, a disassociation frame, a clear to send (CTS) frame, an acknowledgment (ACK) message associated with data frames, etc. While not illustrated, the processor of the wireless communication device may also sample or measure one or more signal characteristics associated with each additional frame received within the anticipated coherence interval.

In block 706, the processor may calculate a second correlation coefficient for each frame type identified in the additional frames received within the anticipated coherence interval. For example, the second correlation coefficient may correspond to the type of frame received and thus the type of MAC address spoofing attack occurring in the network.

In some embodiments, when the processor determines that additional frames received within the anticipated coherence interval include one or more de-authentication frames, the processor may determine the second correlation coefficient using the following equation:

$$\text{Corr } Coeff(X, Channel_{de\_auth\_frame}) = \\ \frac{E\left[(X - \mu_X)(Channel_{de\_auth\_frame} - \mu_{Channel_{de\_auth\_frame}})\right]}{\sqrt{E[(X - \mu_X)^2]} \times \sqrt{E\left[(Channel_{de\_auth\_frame} - \mu_{Channel_{de\_auth\_frame}})^2\right]}}$$

where $\chi \in \{Channel_{beacon}, Channel_{active\_scan\_response}\}$, $Channel_{de\_auth\_frame}$ represents one or more signal characteristics sampled on the channel associated with the de-authentication frame, $Channel_{beacon}$ represents one or more signal characteristics sampled on the channel associated with the beacon frame, and $Channel_{active\_scan\_response}$ represents one or more signal characteristics sampled on the channel associated with the active scan response frame.

In various embodiments, when the additional frames received within the anticipated coherence interval includes one or more disassociation frames, the processor may determine the second correlation coefficient using the following equation:

$$\text{Corr } Coeff(Y, Channel_{disassociation\_frame}) = \\ \frac{E\left[(Y - \mu_Y)(Channel_{disassociation\_frame} - \mu_{Channel_{disassociation\_frame}})\right]}{\sqrt{E[(Y - \mu_Y)^2]} \times \sqrt{E\left[(Channel_{disassociation\_frame} - \mu_{Channel_{disassociation\_frame}})^2\right]}}$$

where $Y \in \{Channel_{beacon}, Channel_{active\_scan\_response}\}$, $Channel_{disassociation\_frame}$ represents one or more signal characteristics sampled on the channel associated with the disassociation frame, $Channel_{beacon}$ represents one or more signal characteristics sampled on the channel associated with the beacon frame, and $Channel_{active\_scan\_response}$ represents one or more signal characteristics sampled on the channel associated with the active scan response frame.

In determination block 708, the processor may determine whether the calculated second correlation coefficient is within a threshold indicative of a particular type of attack. For example, the processor may determine whether the calculated second correlation coefficient is greater than or less than a second predetermined threshold or parameter $\theta_2$ correlated with particular forms of attack exploiting MAC address spoofing.

In some embodiments, the second predetermined threshold or parameter $\theta_2$ may be the same as or differ from the first predetermined threshold parameter $\theta_1$ evaluated in determination block 610 of the method 600. The second predetermined threshold or parameter $\theta_2$ may be determined using machine learning. For example, the second parameter $\theta_2$ can be learned from a training dataset corresponding to one or more known systems. The second parameter $\theta_2$ may be determined before initiating the method 700. In addition, the second parameter $\theta_2$ may be updated either at discrete times or at predetermined intervals.

In response to determining that the second correlation coefficient is within the threshold correlated with particular forms of attack exploiting MAC address spoofing (i.e., determination block 708="Yes"), the processor may initiate a specific counter-measure in block 710. In some embodiments, the specific counter-measure initiated may be based on the frame type used to determine the second coefficient. For example, when the second correlation coefficient is calculated based on de-authentication frames and the second correlation coefficient is determined to be less than the second predetermined parameter $\theta_2$, the processor may determine that a de-authentication attack has occurred, and initiate a counter-measure to the de-authentication attack that may include dynamically reconfiguring software stored in the wireless communication device so that the wireless communication device ignores de-authentication frames corresponding to the spoofed MAC address. Additionally, or alternatively, the wireless communication device 102 may instruct a legitimate third access point (e.g., 108) to ignore the de-authentication frames corresponding to the spoofed MAC address. In some embodiments, the wireless communication device may ignore the de-authentication frames corresponding to the spoofed MAC address indefinitely. In some embodiments, the wireless communication device may ignore the de-authentication frames for a time period such that after the time period expires, the wireless device no longer ignores the de-authentication frames corresponding to the MAC address.

In some embodiments, when the processor classifies the MAC address spoofing attack as a disassociation attack, the processor may ignore disassociation frames corresponding to the spoofed MAC address. Additionally, or alternatively, the wireless communication device may instruct a legitimate access point (e.g., 108) to ignore the disassociation frames corresponding to the spoofed MAC address. In some embodiments, the wireless communication device may ignore the disassociation frames corresponding to the spoofed MAC address indefinitely. In some embodiments, the wireless communication device may ignore the de-authentication frames for a time period such that after the time period expires, the wireless device 102 no longer ignores the disassociation frames corresponding to the MAC address.

In some embodiments, when the processor classifies the MAC address spoofing attack as a sleep deprivation attack, the processor may ignore beacon frames corresponding to the spoofed MAC address. Additionally, or alternatively, the processor may update an access point white list (e.g., a list of approved access points available to initiate communications) in which the access point associated with the spoofed MAC address is removed. When the access point associated with the spoofed MAC address is removed from the white list, the wireless communication device will no longer attempt to initiate communication with the removed access point, and will ignore any beacon frames received from the removed access point. The access point white list may be updated in the wireless communication device and/or within a node of the evolved packet core 110.

In response to determining that the calculated second correlation coefficient is not within the threshold correlated with particular forms of attack exploiting MAC address spoofing (i.e., determination block 708="No"), the processor may initiate a default counter-measure in block 712. For example, the processor may stop the scheduling and/or generation of any additional active scan requests corresponding to the MAC address being examined.

Figure 8:
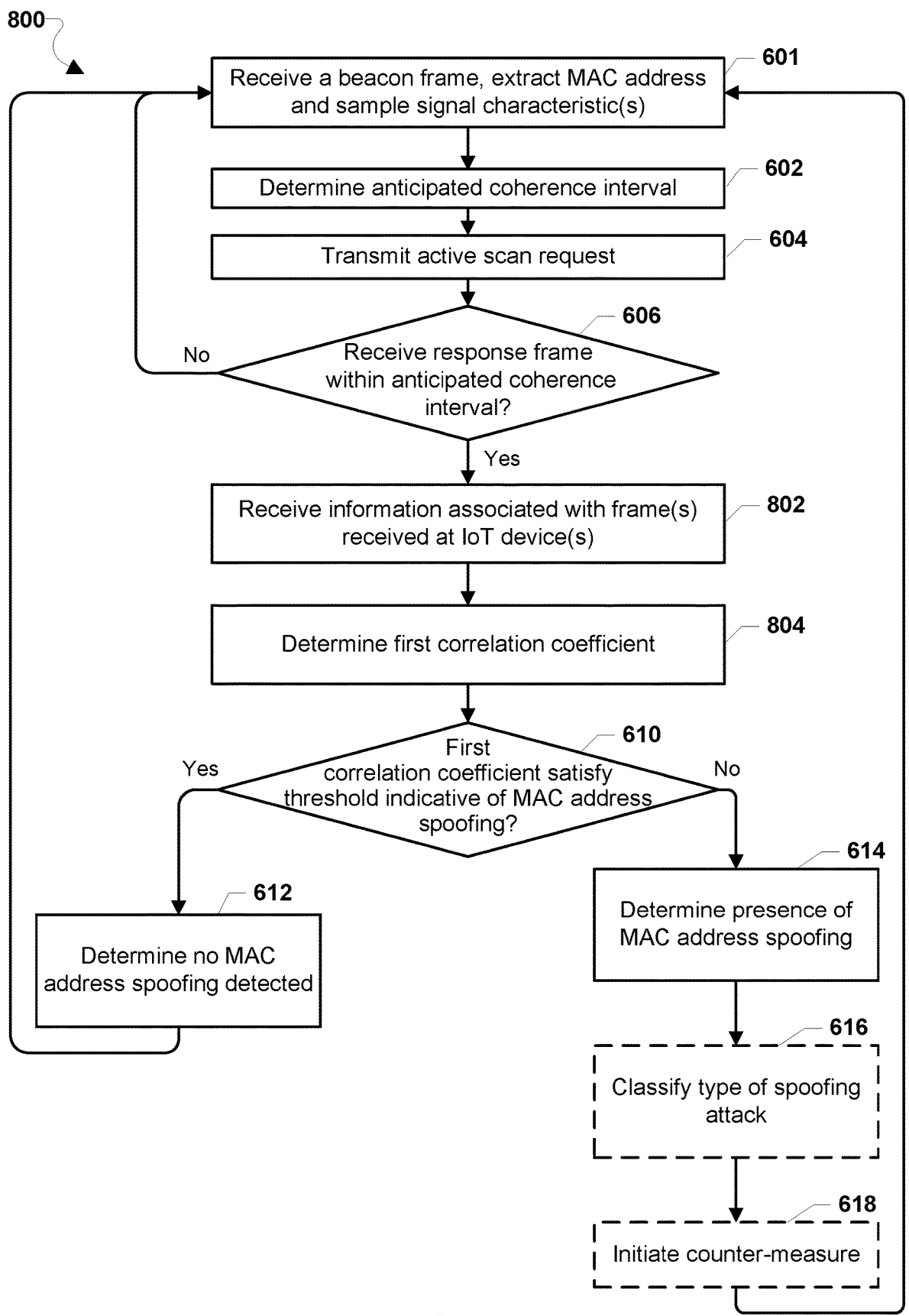
FIG. 8 is a process flow diagram illustrating another method of determining whether MAC address spoofing is present in a network according to various embodiments.

FIG. 8 illustrates a method 800 for determining whether a MAC address spoofing attack is present in a network including one or more IoT devices according to some embodiments. With reference to FIGS. 1-8, the method 800 may be implemented by one or more processors (e.g., 202) of a wireless communication device (e.g., 102 200) in conjunction with an IoT device (e.g., 120). The operations in blocks 601-618 may be performed as described for the method 600.

In block 802, the processor may receive information associated with one or more frames received at one or more IoT or smart home devices. For example, after the wireless communication device transmits an active scan request, the wireless communication device and/or the IoT devices may be configured to sample channel measurements associated with the active scan request response frames, as well as other frames received during the anticipated coherence interval. When the one or more IoT devices receive frames during the anticipated coherence interval, each of the one or more IoT devices may measure one or more signal characteristics associated with each frame received during the anticipated coherence interval. Each of the one or more IoT devices may transmit to the wireless communication device (e.g., 102) the one or more signal characteristics associated with each frame, as well as information associated with each received frame (e.g., information included in the frame, frame type, etc.).

In block 804, the wireless communication device may determine a first correlation coefficient using the signal characteristics sampled by the wireless communication device and the signal characteristics received from the one or more IoT devices.

The method 800 may be useful in situations in which a rogue access point acts as a jammer for the wireless communication device and/or one or more IoT devices during transmission of frames (e.g., beacon frames, response frames, etc.) transmitted from a benign access point (e.g., 108). Due to the existence of the well-known hidden terminal problem in wireless networks, the rogue access point may not be able to simultaneously jam all of the IoT devices in the vicinity, in addition to the benign access point (e.g., 108). Since the IoT devices may have a better vantage point to receive a combination or mix of measurements from both the benign access point and the rogue access points, the wireless communication device may take advantage of the information associated with the frames received at the IoT devices as well. By including the information associated with the frames received at the IoT devices in addition to the information associated with the frames received at the wireless communication device, diversity of measurements collected in the network may be improved. This may enable the wireless communication device processor to reliably determine a more accurate correlation coefficient in block 804 than achievable in such situations in block 608 of the method 600.

Figure 9:
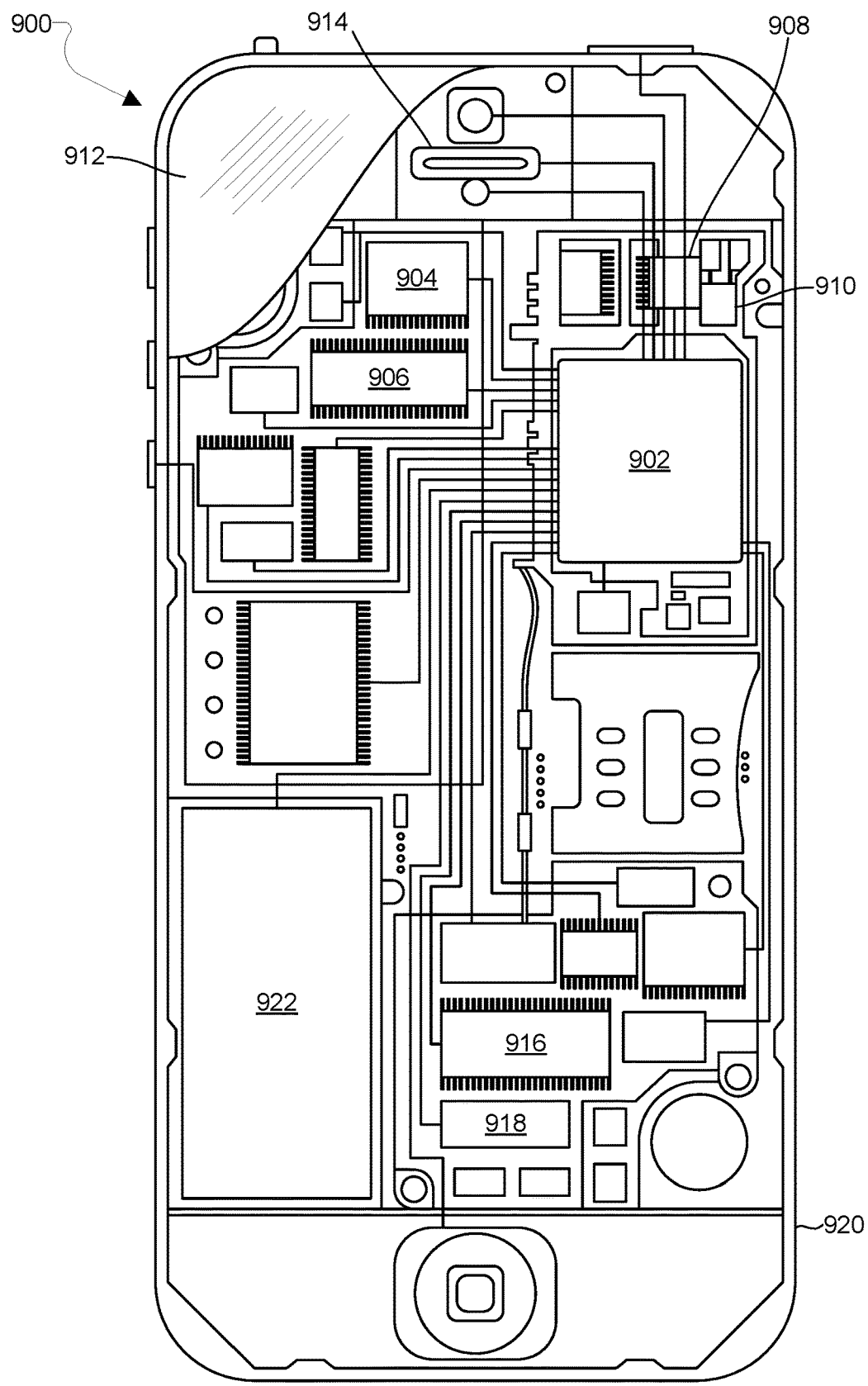
FIG. 9 is a component block diagram of a wireless communication device according to various embodiments.

Various embodiments (including, but not limited to, the embodiments described with reference to FIGS. 1, 2, 6-8) may be implemented in any of a variety of wireless communication devices, an example 900 of which is illustrated in FIG. 9. With reference to FIGS. 1-8, the wireless communication device 900 (which may correspond, for example, to the wireless communication devices 102 and/or 200 in FIGS. 1 and 2 and/or the IoT device 120 in FIG. 1) may include a processor 902 coupled to a touchscreen controller 904 and an internal memory 906. The processor 902 may be one or more multicore ICs designated for general or specific processing tasks. The internal memory 906 may be volatile or non-volatile memory, and may also be secure and/or encrypted memory, or unsecure and/or unencrypted memory, or any combination thereof.

The touchscreen controller 904 and the processor 902 may also be coupled to a touchscreen panel 912, such as a resistive-sensing touchscreen, capacitive-sensing touchscreen, infrared sensing touchscreen, etc. The wireless communication device 900 may have one or more radio signal transceivers 908 (e.g., Peanut®, Bluetooth®, ZigBee®, Wi-Fi, RF radio) and antennas 910, for sending and receiving, coupled to each other and/or to the processor 902. The transceivers 908 and antennas 910 may be used with the above-mentioned circuitry to implement the various wireless transmission protocol stacks and interfaces. The wireless communication device 900 may include a cellular network wireless modem chip 916 that enables communication via a cellular network and is coupled to the processor. The wireless communication device 900 may include a peripheral device connection interface 918 coupled to the processor 902. The peripheral device connection interface 918 may be singularly configured to accept one type of connection, or multiply configured to accept various types of physical and communication connections, common or proprietary, such as USB, FireWire, Thunderbolt, or PCIe. The peripheral device connection interface 918 may also be coupled to a similarly configured peripheral device connection port (not shown). The wireless communication device 900 may also include speakers 914 for providing audio outputs. The wireless communication device 900 may also include a housing 920, constructed of a plastic, metal, or a combination of materials, for containing all or some of the components discussed herein. The wireless communication device 900 may include a power source 922 coupled to the processor 902, such as a disposable or rechargeable battery. The rechargeable battery may also be coupled to the peripheral device connection port to receive a charging current from a source external to the wireless communication device 900.

Figure 10:
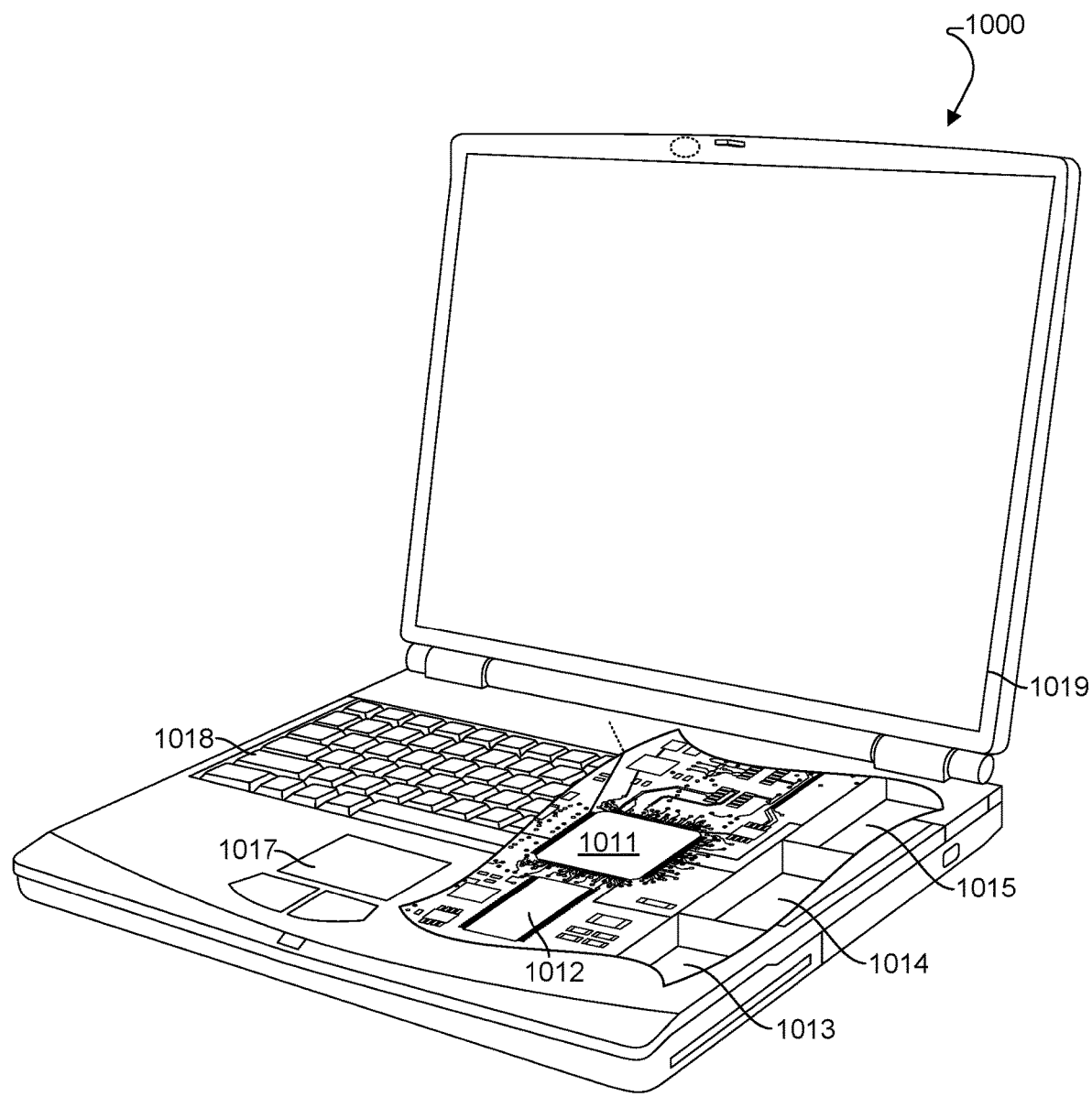
FIG. 10 is a component block diagram of another wireless communication device according to various embodiments.

Various embodiments (including, but not limited to, the embodiments discussed above with reference to FIGS. 1, 2, 6-8), may be implemented within a variety of wireless communication devices, an example 1000 of which is illustrated in FIG. 10. With reference to FIGS. 1-10, the laptop computer 1000 (which may correspond, for example, to the wireless communication devices 102, 200 and IoT devices 120 in FIGS. 1 and 2) may include a touchpad touch surface 1017 that serves as the computer's pointing device, and thus may receive drag, scroll, and flick gestures similar to those implemented on wireless computing devices equipped with a touchscreen display as described. A laptop computer 1000 will typically include a processor 1011 coupled to volatile memory 1012 and a large capacity nonvolatile memory, such as a disk drive 1013 of Flash memory. The computer 1000 may also include a floppy disc drive 1014 and a compact disc (CD) drive 1015 coupled to the processor 1011. The computer 1000 may also include a number of connector ports coupled to the processor 1011 for establishing data connections or receiving external memory devices, such as a Universal Serial Bus (USB) or FireWire® connector sockets, or other network connection circuits for coupling the processor 1011 to a network. In a notebook configuration, the computer housing includes the touchpad 1017, the keyboard 1018, and the display 1019 all coupled to the processor 1011. Other configurations of the computing device may include a computer mouse or trackball coupled to the processor (e.g., via a USB input) as are well known, which may also be used in conjunction with various embodiments.

With reference to FIGS. 1-10, the processors 902 and 1011 may be any programmable microprocessor, microcomputer or multiple processor chip or chips that can be configured by software instructions (applications) to perform a variety of functions, including the functions of various embodiments as described. In some devices, multiple processors may be provided, such as one processor dedicated to wireless communication functions and one processor dedicated to running other applications. Typically, software applications may be stored in the internal memory 906, 1012, and 1013 before they are accessed and loaded into the processors 902 and 1011. The processors 902 and 1011 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 902, 1011, including internal memory or removable memory plugged into the device and memory within the processor 902 and 1011, themselves.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods.

The terms "A or B", "at least one of A and/or B", or "one or more of A and/or B" may include all possible combinations of items listed together. For example, the terms "A or B", "at least one of A and B", or "at least one of A or B" may indicate all the cases of (1) including at least one A, (2) including at least one B, and (3) including at least one A and at least one B.

The terms "first", "second", and the like used herein may modify various elements regardless of the order and/or priority thereof, and are used only for distinguishing one element from another element, without limiting the elements. For example, "a first element" and "a second element" may indicate different elements regardless of the order or priority. For example, without departing the scope of the present disclosure, a first element may be referred to as a second element and vice versa. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of determining whether media access control (MAC) address spoofing is present in a wireless communication network, comprising:
receiving a beacon frame;
determining, by a processor of the wireless communication device, an anticipated coherence interval after reception of the beacon frame based on at least one of a speed of the wireless communication device and a frequency band in which the beacon frame is transmitted;
transmitting an active scan request by the wireless communication device in response to receiving the beacon frame;
determining, by the processor, whether a response frame corresponding to the active scan request is received within the anticipated coherence interval;
measuring, by the processor, a signal characteristic of the beacon frame based on a channel impulse response during the anticipated coherence interval;
measuring, by the processor, a signal characteristic of the response frame based on the channel impulse response;
determining, by the processor, a first correlation coefficient in response to determining that the response frame was received within the anticipated coherence interval, wherein the first correlation coefficient is based on a correlation between the measured signal characteristic of the response frame and the measured signal characteristic of the beacon frame;
determining that MAC address spoofing is not present in the wireless communication network when the first correlation coefficient is greater than a first predetermined threshold correlation between the measured signal characteristic of the response frame and the measured signal characteristic of the beacon frame;
determining, by the processor, whether one or more additional frames are received within the anticipated coherence interval in response to determining that MAC address spoofing is present in the wireless communication network;
determining, by the processor, a frame type of each of the one or more additional frames received within the anticipated coherence interval;
determining, by the processor, a second correlation coefficient for each frame type of the one or more additional frames received within the anticipated coherence interval; and
initiating, by the processor, a first counter-measure in response to determining that the second correlation coefficient for each frame type is less than a second predetermined threshold.

2. The method of claim 1, wherein the measured signal characteristic of the response frame or the beacon frame is further based on at least one of a received signal strength indicator (RSSI), a channel frequency response, and angle of arrival.

3. The method of claim 1, further comprising:
determining, by the processor, a presence of MAC address spoofing in the wireless communication network in response to determining that the first correlation coefficient is less than the first predetermined threshold; and
initiating, by the processor, a counter-measure in response to determining the presence of MAC address spoofing in the wireless communication network.

4. The method of claim 3, wherein the counter-measure includes at least one of a sleep-deprivation attack counter-measure, a de-authentication attack counter-measure, and a disassociation attack counter-measure.

5. The method of claim 1, further comprising:
initiating, by the processor, a second counter-measure in response to determining that the second correlation coefficient for each frame type is greater than the second predetermined threshold.

6. The method of claim 1, wherein determining a second correlation coefficient for each frame type of the one or more additional frames received within the anticipated coherence interval comprises determining, by the processor, the second correlation coefficient based on a measured signal characteristic of the response frame, a measured signal characteristic of the beacon frame, and a measured signal characteristic of one of the one or more additional frames received within the anticipated coherence interval.

7. The method of claim 1, further comprising:
receiving, by the processor, a measured signal characteristic corresponding to each frame received at one or more Internet of things (IoT) devices within the anticipated coherence interval; and
determining, by the processor, whether MAC address spoofing is present in the wireless communication network based on the measured signal characteristic corresponding to each frame received at the one or more IoT devices within the anticipated coherence interval.

8. The method of claim 1, wherein the anticipated coherence interval is based on the speed of the wireless communication device and the frequency band in which the beacon frame is transmitted, the speed of the wireless communication device being a rate at which the wireless communication device moves over time.

9. The method of claim 1, wherein the anticipated coherence interval is based on the speed of the wireless communication device, the speed of the wireless communication device being a rate at which the wireless communication device moves over time.

10. A wireless communication device, comprising:
a radio frequency (RF) resource; and
a processor coupled to the RF resource and configured with processor-executable instructions to:
receive, a beacon frame;
determine an anticipated coherence interval after reception of the beacon frame based on at least one of a speed of the wireless communication device and a frequency band in which the beacon frame is transmitted;
transmit an active scan request in response to receiving the beacon frame;
determine whether a response frame corresponding to the active scan request is received within the anticipated coherence interval;
measure a signal characteristic of the beacon frame based on a channel impulse response during the anticipated coherence interval;
measure a signal characteristic of the response frame based on the channel impulse response;

determine a first correlation coefficient in response to determining that the response frame was received within the anticipated coherence interval, wherein the first correlation coefficient is determined based on a correlation between the measured signal characteristic of the response frame and the measured signal characteristic of the beacon frame;

determine that MAC address spoofing is not present in a wireless communication network when the first correlation coefficient is greater than a first predetermined threshold correlation between the measured signal characteristic of the response frame and the measured signal characteristic of the beacon frame;

determine whether one or more additional frames are received within the anticipated coherence interval in response to determining that MAC address spoofing is present in the wireless communication network;

determine a frame type of each of the one or more additional frames received within the anticipated coherence interval;

determine a second correlation coefficient for each frame type of the one or more additional frames received within the anticipated coherence interval; and initiate a first counter-measure in response to determining that the second correlation coefficient for each frame type is less than a second predetermined threshold.

11. The wireless communication device of claim 10, wherein the processor is further configured with processor-executable instructions to measure the signal characteristic of the response frame or the beacon frame further based on at least one of a received signal strength indicator (RSSI), a channel frequency response, and angle of arrival.

12. The wireless communication device of claim 10, wherein the processor is further configured with processor-executable instructions to:

determine a presence of MAC address spoofing in the wireless communication network in response to determining that the first correlation coefficient is less than the first predetermined threshold; and initiate a counter-measure in response to determining the presence of MAC address spoofing in the wireless communication network.

13. The wireless communication device of claim 12, wherein the counter-measure includes at least one of a sleep-deprivation attack counter-measure, a de-authentication attack counter-measure, and a disassociation attack counter-measure.

14. The wireless communication device of claim 10, wherein the processor is further configured with processor-executable instructions to:

initiate a second counter-measure in response to determining that the second correlation coefficient for each frame type is greater than the second predetermined threshold.

15. The wireless communication device of claim 10, wherein the processor is further configured with processor-executable instructions to determine the second correlation coefficient based on a measured signal characteristic of the response frame, a measured signal characteristic of the beacon frame, and a measured signal characteristic of one of the one or more additional frames received within the anticipated coherence interval.

16. The wireless communication device of claim 10, wherein the processor is further configured with processor-executable instructions to:

receive a measured signal characteristic corresponding to each frame received at one or more Internet of things (IoT) devices within the anticipated coherence interval; and determine whether MAC address spoofing is present in the wireless communication network based on the measured signal characteristic corresponding to each frame received at the one or more IoT devices within the anticipated coherence interval.

17. The wireless communication device of claim 10, wherein the anticipated coherence interval is based on the speed of the wireless communication device and the frequency band in which the beacon frame is transmitted, the speed of the wireless communication device being a rate at which the wireless communication device moves over time.

18. The wireless communication device of claim 10, wherein the anticipated coherence interval is based on the speed of the wireless communication device, the speed of the wireless communication device being a rate at which the wireless communication device moves over time.

19. A non-transitory processor-readable storage medium having stored thereon processor-executable instructions configured to cause a processor of a wireless communication device to perform operations comprising:

receiving a beacon frame;

determining an anticipated coherence interval after reception of the beacon frame based on at least one of a speed of the wireless communication device and a frequency band in which the beacon frame is transmitted;

transmitting an active scan request in response to receiving the beacon frame;

determining whether a response frame corresponding to the active scan request is received within the anticipated coherence interval;

measuring a signal characteristic of the beacon frame based on a channel impulse response during the anticipated coherence interval;

measuring a signal characteristic of the response frame based on the channel impulse response;

determining a first correlation coefficient in response to determining that the response frame was received within the anticipated coherence interval, wherein the first correlation coefficient is based on a correlation between the measured signal characteristic of the response frame and the measured signal characteristic of the beacon frame;

determining that MAC address spoofing is not present in a wireless communication network when the first correlation coefficient is greater than a first predetermined threshold correlation between the measured signal characteristic of the response frame and the measured signal characteristic of the beacon frame;

determining whether one or more additional frames are received within the anticipated coherence interval in response to determining that MAC address spoofing is present in the wireless communication network;

determining a frame type of each of the one or more additional frames received within the anticipated coherence interval;

determining a second correlation coefficient for each frame type of the one or more additional frames received within the anticipated coherence interval; and initiating a first counter-measure in response to determining that the second correlation coefficient for each frame type is less than a second predetermined threshold.

20. The non-transitory processor-readable storage medium of claim 19, wherein measuring the signal characteristic of the response frame or the beacon frame comprises measuring the signal characteristic further based on at least one of a received signal strength indicator (RSSI), a channel frequency response, and angle of arrival.

21. The non-transitory processor-readable storage medium of claim 19, wherein the stored processor-executable instructions are configured to cause the processor of the wireless communication device to perform operations further comprising:
    determining a presence of MAC address spoofing in the wireless communication network in response to determining that the first correlation coefficient is less than the first predetermined threshold; and
    initiating a counter-measure in response to determining the presence of MAC address spoofing in the wireless communication network.

22. The non-transitory processor-readable storage medium of claim 21, wherein the counter-measure includes at least one of a sleep-deprivation attack counter-measure, a de-authentication attack counter-measure, and a disassociation attack counter-measure.

23. The non-transitory processor-readable storage medium of claim 19, wherein the stored processor-executable instructions are configured to cause the processor of the wireless communication device to perform operations further comprising:
    initiating a second counter-measure in response to determining that the second correlation coefficient for each frame type is greater than the second predetermined threshold.

24. The non-transitory processor-readable storage medium of claim 19, wherein the stored processor-executable instructions are configured to cause the processor of the wireless communication device to perform operations further comprising:
    receiving a measured signal characteristic corresponding to each frame received at one or more Internet of things (IoT) devices within the anticipated coherence interval; and
    determining whether MAC address spoofing is present in the wireless communication network based on the measured signal characteristic corresponding to each frame received at the one or more IoT devices within the anticipated coherence interval.

* * * * *